United States Patent [19]

Takeda et al.

[11] Patent Number: 5,703,729
[45] Date of Patent: Dec. 30, 1997

[54] IMAGE INPUTTING APPARATUS

[75] Inventors: Morihiro Takeda; Masanao Nakahara, both of Shiga, Japan

[73] Assignee: Dainippon Screen Mfg. Co., Ltd., Kyoto, Japan

[21] Appl. No.: 559,699

[22] Filed: Nov. 15, 1995

[30] Foreign Application Priority Data

Dec. 12, 1994 [JP] Japan .................................. 6-307716
Dec. 13, 1994 [JP] Japan .................................. 6-309006

[51] Int. Cl.$^6$ .............................. G02B 7/02; H04H 1/393
[52] U.S. Cl. ........................................... 359/821; 358/451
[58] Field of Search ........................... 359/821; 358/448, 358/451, 453; 382/148

[56] References Cited

U.S. PATENT DOCUMENTS

| 4,565,865 | 1/1986 | Yamada | 358/287 |
| 4,589,140 | 5/1986 | Bishop | 382/8 |
| 4,870,357 | 9/1989 | Young | 324/158 |

FOREIGN PATENT DOCUMENTS

| 0 041 400 | 12/1981 | European Pat. Off. . |
| 0 027 373 | 4/1983 | European Pat. Off. . |
| 0 213 539 | 3/1987 | European Pat. Off. . |
| 3-1752 | 1/1991 | Japan . |
| 2 159 365 | 11/1985 | United Kingdom . |

OTHER PUBLICATIONS

Patent Abstracts of Japan, vol. 13, No. 81 (E–719), Fuji Photo Film Co. Ltd., 1988.
Patent Abstracts of Japan, vo. 7, No. 218 (E–200), Canon KK, 1983.

*Primary Examiner*—David C. Nelms
*Assistant Examiner*—Ricky Mack
*Attorney, Agent, or Firm*—Lowe, Price, LeBlanc & Becker

[57] ABSTRACT

In an optical system, when a binary image is to be read, a first reducing projection lens is located onto an optical axis and focuses an image of the original at a first magnification (relatively high magnification), and a mirror divides the entire image into three divided images which will be then projected onto three CCDs, respectively. On the other hand, when a multivalued image is to be read, a second reducing projection lens is located onto the optical axis and focuses an image of the original at a second magnification (relatively low magnification) which is lower than the first magnification, and the entire image is projected onto one of the three CCDs.

12 Claims, 8 Drawing Sheets

IMAGE INPUTTING APPARATUS

BACKGROUND OF THE INVENTION

1. Field of the Invention

The present invention relates to an image inputting apparatus using a solid linear image sensor, and more particularly, to an image inputting apparatus which switches optical systems depending on the contents of an image to be inputted, etc.

2. Description of the Background Art

Conventional image inputting apparatuses are classified into those for reading binary data principally from a linear image and those for reading multivalued data from a continuous tone image such as a photograph.

In the former image inputting apparatus which reads a binary image, a linear image is created by an optical system is divided into a plurality of divided images, each divided image is projected onto each one of line sensors, and the line sensors read the divided images. Overlapping processing is performed on pixels which have the same image information regarding the original image at boundary portions between adjacent line sensors, whereby the images are read at a high resolution without skipping some image portions or without reading the redundant image information (See Japanese Unscreened Publication No. 3-1752). The reason for dividing an image into a plurality of divided images and projecting each divided image onto each associated line sensor is that no conventional sensor has a high pixel density and a relatively long effective reading length. Since line sensors which are long enough to read the entire image within the scanning line region have a low pixel density, i.e., have a small number of pixels in total, when the image is directly projected onto the line sensor without dividing the image, the line sensor cannot read the image at a high resolution.

On the other hand, in the latter image inputting apparatus which reads a multivalued image, since an image to be read is a continuous tone image, when the image is detected by a similar method to that used for the former image inputting apparatus, a density difference which the original image does not have is created in the detected image at an overlapping portion due to a subtle difference in the sensitivity between line sensors. To solve this problem, a reference object in the form of a tablet with a density which varies stepwisely or continuously, e.g., a gray scale, is placed at a position which corresponds to an overlapping portion of line sensors on a plane for mounting the original image and the image is read from a low density to a high density in advance. Data thus obtained are electrically corrected in such a manner that output levels at overlapping portions of the line adjacent sensors become equal to each other at each reading position. However, even with such correction, the overlapping processing is not completely satisfactory. Hence, when a multivalued image is to be read, the former reading method is not used in general. Rather, an original image is reduced in size and projected upon a single line sensor and the entire image is read.

Thus, an image inputting apparatus for handling a binary image needs to satisfy different specifications from those demanded for an image inputting apparatus which handles a multivalued image, and therefore, the two types of apparatuses use radically different reading methods. This makes it impossible to use one image inputting apparatus to read both a binary image and a multivalued image with a high image quality. In other words, when a multivalued image is read by an image inputting apparatus for handling a binary image, it is likely that a discontinuous portion will be created at an overlapping portion of a CCD (charge coupled device). Conversely, when a binary image is read by an image inputting apparatus for handling a multivalued image, a resolution deteriorates.

SUMMARY OF THE INVENTION

The present invention is directed to an image inputting apparatus for reading an image of an original, which includes an imaging part; and moving means for moving an original and the imaging part relative to each other. The imaging part comprises: a plurality of solid linear image sensors; and an optical system for focusing a binary image of an original at a first magnification, dividing the image into a plurality of divided images and projecting each divided image onto an associated one of the solid linear image sensors during reading of the original binary image, the optical system focusing a multivalued image of an original at a second magnification which is lower than the first magnification and projecting the image onto one of the solid linear image sensors during reading the multivalued image.

The present invention is also directed to a lens switching apparatus for switching a first lens and a second lens which are different from each other on an optical axis. The lens switching apparatus includes: a first lens holder for holding the first lens, the first lens holder being movable between a first on-axis position on the optical axis and a first retrieval position off the optical axis; a second lens holder for holding the second lens, the second lens holder being movable between a second on-axis position on the optical axis and a second retrieval position off the optical axis which is close to the first retrieval position; and lens driving means for switching the first and the second lens holders to move the first and the second lens holders alternately onto the optical axis, the lens driving means moving the second lens holder to the second retrieval position when the first lens holder is at the first on-axis position, the lens driving means moving the second lens holder to the second on-axis position when the first lens holder is at the first retrieval position.

An imaging part includes an optical system and a sensor part. In the disclosed optical system, when a binary image formed principally by a linear image is to be read, a first reducing projection lens moved onto an optical axis focuses an image of the original at a first magnification (relatively high magnification), and a mirror divides the entire image into three divided images which will be then projected onto three CCDs, respectively, which form the sensor part. On the other hand, when a multivalued image formed principally by a continuous tone image is to be read, a second reducing projection lens moved onto the optical axis focuses an image of the original at a second magnification (relatively low magnification) which is lower than the first magnification, and the entire image is projected onto one CCD which forms the sensor part.

Accordingly, it is an object of the present invention to obtain an image inputting apparatus which can read both a binary image and a multivalued image with a high image quality.

These and other objects, features, aspects and advantages of the present invention will become more apparent from the following detailed description of the present invention when taken in conjunction with the accompanying drawings.

DESCRIPTION OF THE PREFERRED EMBODIMENTS

<Image Inputting Apparatus>

Figure 1A:
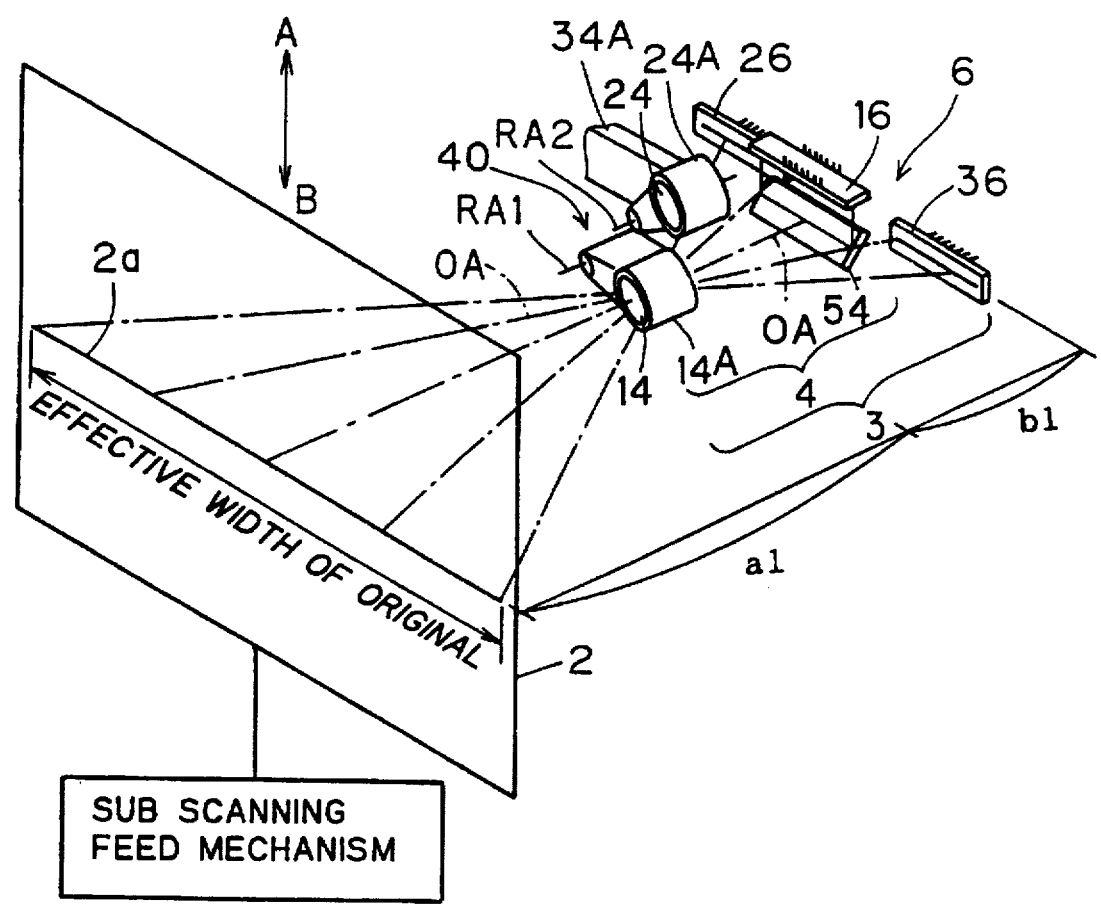
FIGS. 1A and 1B are perspective views showing a structure of an image inputting apparatus according to a first preferred embodiment of the present invention.
Figure 1B:
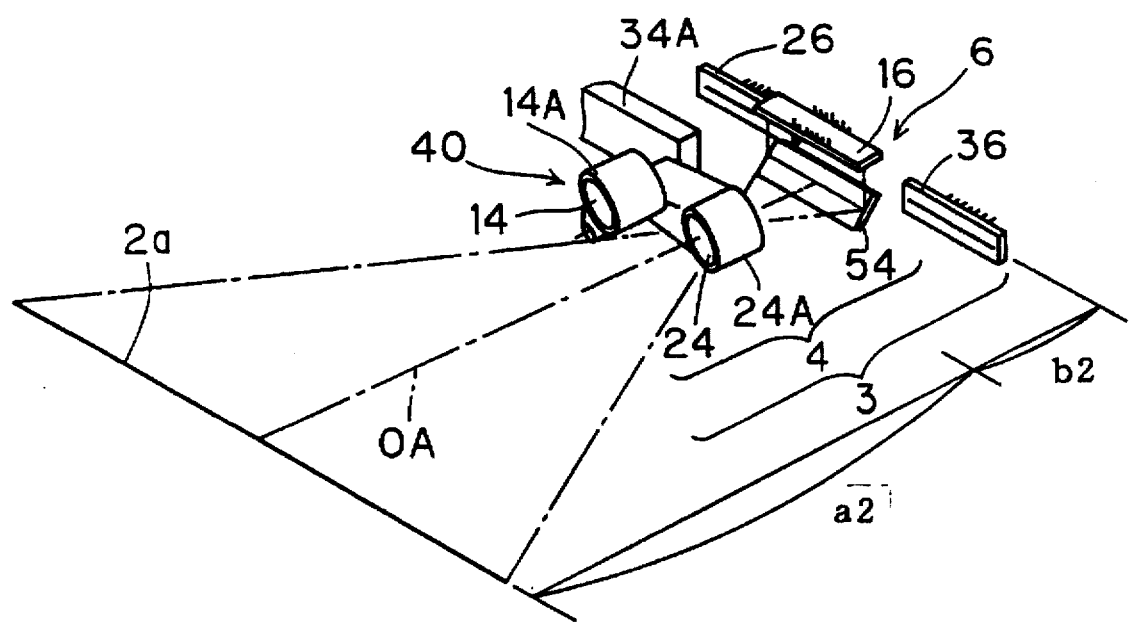

FIGS. 1A and 1B are perspective views showing a principal part of an image inputting apparatus according to a first preferred embodiment of the present invention. FIG. 1A shows a state of an optical system with which the image inputting apparatus is equipped when a binary image, typically a linear image, is read. FIG. 1B shows a state of the optical system when a multivalued image, typically a continuous tone image, is read.

A sub scanning direction feed mechanism 5 feeds an original image 2 in a direction A-B with respect to an image reading part 3. After reduced or divided depending on a need by an optical system 4 of the image reading part 3, light from a strip-like scanning region 2a whose length covers an effective width of the original image 2 is projected onto a sensor part 6 of the image reading part 3.

The optical system 4 is formed by a variable power optical system 40 which changes the size of the image of the original between a first magnification and a second magnification as described later, and a mirror 54 which functions as image dividing means for dividing the original image at the first magnification which is obtained by the variable power optical system 40 and for projecting a divided image upon the sensor part 6.

The variable power optical system 40 includes a first reducing projection lens 14 which is held by a lens holder 14A and a second reducing projection lens 24 which is held by a lens holder 14B. A lens driving apparatus 34A alternately moves the reducing projection lenses 14 and 24 on an optical axis OA of the optical system 4, whereby the image of the original 2 with a changed imaging magnification is projected onto the sensor part 6. That is, when a binary image formed principally by a linear image is to be read from the original 2, the first reducing projection lens 14 is moved onto the optical axis OA, an image of the scanning region 2a of the original 2 is focused at the first magnification m1 and the divided images are projected onto three CCDs, i.e., linear image sensors 16, 26 and 36 which form the sensor part 6 (See FIG. 1A). On the other hand, when a multivalued image formed principally by a continuous tone image is to be read from the original 2, the second reducing projection lens 24 is moved onto the optical axis OA, the image of a scanning region 2a of the original 2 is focused at the second magnification m2 which is lower than the first magnification m1 and the image is projected through mirror 54 only onto the CCD 16 which is on the optical axis OA, i.e., the one in the center of the CCDs 16, 26 and 36 which form the sensor part 6 (See FIG. 1B).

In the present embodiment, the first and the second magnifications m1 and m2 are reduction magnifications (that is, m1<1, m2<1: m2<m1). The first reduction magnification m1 is higher than the second reduction magnification m2. Conversely, the second reduction magnification m2 is lower than the first reduction magnification m1. Hence, these magnifications m1 and m2 will be referred to by general terms as "relatively high magnification" and "relatively low magnification" in the following, respectively. Images formed by the first and the second reducing projection lenses 14 and 24 will be referred to as "relatively high magnification image" and "relatively low magnification image," respectively.

The present invention is not limited to such a case but rather is applicable to a case where the first magnification m1 is an unchanged magnification (m=1) and the second magnification m2 is a reduction magnification (m2<1).

The lens driving apparatus 34A operates in unison with the lens holders 14A and 24A to switch lenses. That is, as shown in FIG. 1A, the lens driving apparatus 34A rotates the first reducing projection lens 14 about an axis of rotation $RA_1$ which is parallel to but spaced away by a predetermined distance from the optical axis OA and the second reducing projection lens 24 about an axis of rotation $RA_2$ which is parallel to but spaced away by a predetermined distance from the optical axis OA. As a result, the reducing projection lenses 14 and 24 each move between an imaging position on the optical axis OA of the optical system 4 and a retrieval position off the optical axis OA. When moving reciprocally in such a manner, the reducing projection lenses 14 and 24 rotate in opposite directions to each other. Thus, the reducing projection lenses 14 and 24 alternately move back and forth on the optical axis OA. When the first reducing projection lens 14 is moved to the imaging position on the optical axis OA, the second reducing projection lens 24 is moved to the retrieval position (See FIG. 1A). When the second reducing projection lens 24 is moved to the imaging position on the optical axis OA, the first reducing projection lens 14 is moved to the retrieval position (See FIG. 1B).

After describing an embodiment of an image inputting apparatus, a detailed description will be given on a structure and an operation of the lens switching apparatus.

Since the reducing projection lenses 14 and 24 have different imaging magnifications, the reducing projection lenses 14 and 24 are located at different positions on the optical axis OA. That is, the magnification m1 of the first reducing projection lens 14 is approximately (distance a1/distance b1) in FIG. 1A, and the magnification m2 of the second reducing projection lens 24 is approximately (distance a2/distance b2) in FIG. 1B.

The mirror 54 of the optical system 4 is disposed between the reducing projection lens 14 or 24 positioned on the optical axis OA and the center CCD 16 on the optical axis OA. The mirror 54 divides a light beam expressing a relatively high magnification image from the first reducing projection lens 14 which is located at the imaging position into three light beams and guides the three light beams into the CCDs 16, 26 and 36 so that each CCD detects only one of the three divided light beams. At the same time, the mirror 54 guides a light beam expressing a relatively low magnification image from the second reducing projection lens 24 which is located at the imaging position into the center CCD 16.

The CCDs 16, 26 and 36 which form the sensor part 6 have the same structure. At linear light receiving areas, the CCDs 16, 26 and 36 receive the three divided beams of the light beam expressing the relatively high magnification image from the first reducing projection lens 14. The light beam expressing the relatively low magnification image from the second reducing projection lens 24 is projected onto the linear light receiving area of the center CCD 116.

Outputs from the CCDs 16, 26 and 36 are processed by a CCD driving circuit and a signal processing circuit not shown. More precisely, when a binary image formed principally by a linear image is to be read, patterns of a binary signal are judged at portions which correspond to overlapping portions at edges of the CCDs 16, 26 and 36, and overlapping processing is performed on an image signal by correcting a positional deviation so that the patterns coincide with each other. As a result, a one-dimensional binary image signal is obtained which is similar to that obtained with the CCDs 16, 26 and 36 arranged in a line without any space between with the CCDs 16, 26 and 36. When a multivalued image formed principally by a continuous tone image is to be read, a one-dimensional binary image signal is obtained from only the center CCD 116.

Although a relatively high magnification image from the first reducing projection lens 14 which is disposed at the imaging position is divided into three images and projected onto the CCDs 16, 26 and 36 in the first preferred embodiment, the relatively high magnification image from the first reducing projection lens 14 may be divided into four or more images and projected onto four or more CCDs.

Figure 2A:
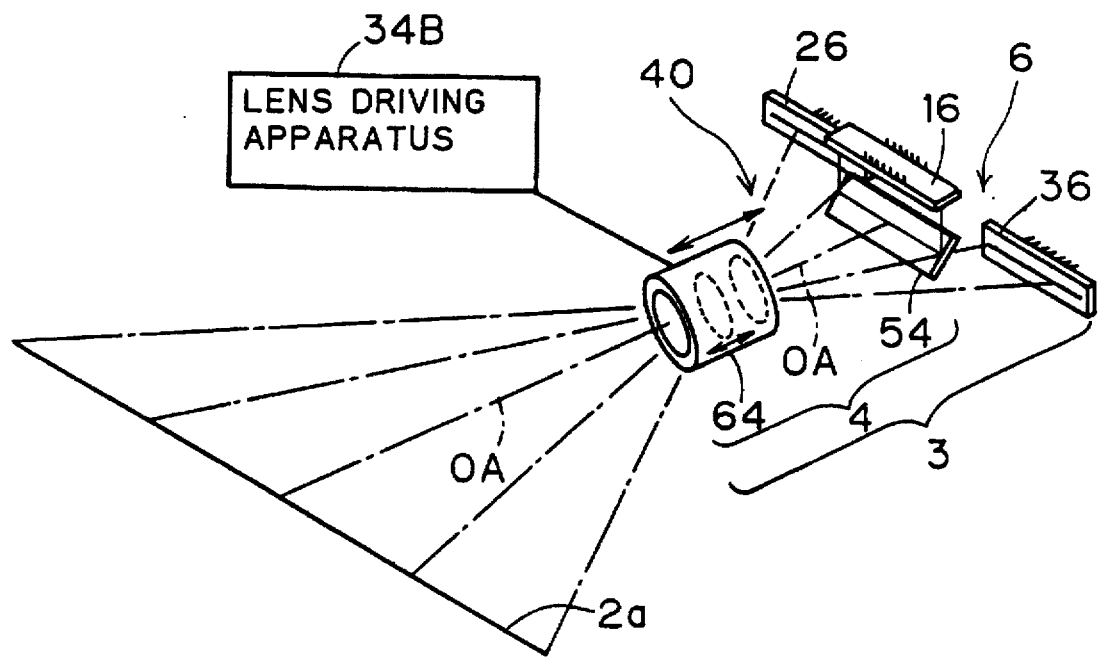
FIGS. 2A and 2B are perspective views showing a structure of an image inputting apparatus according to a second preferred embodiment of the present invention.
Figure 2B:
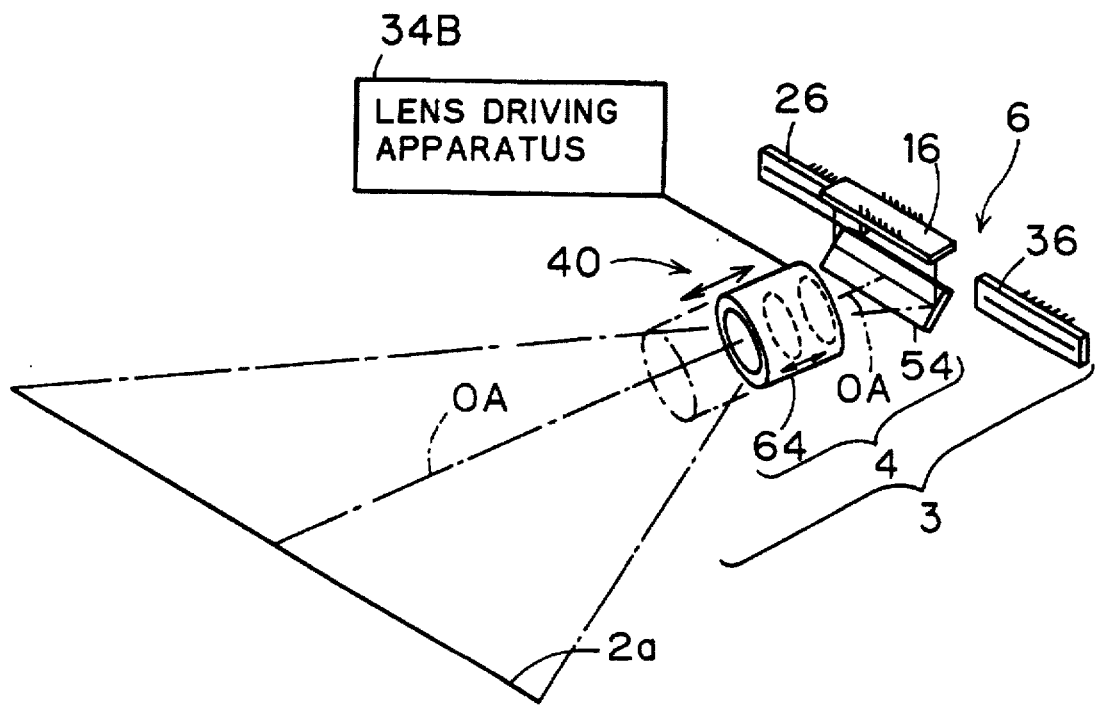

FIGS. 2A and 2B are perspective views showing a structure of an image inputting apparatus according to a second preferred embodiment of the present invention. FIG. 2A shows the image inputting apparatus as it is reading a binary image formed principally by a linear image and FIG. 2B shows the image inputting apparatus as it is reading a multivalued image formed principally by a continuous tone image. The image inputting apparatus according to the second preferred embodiment is the same as the image inputting apparatus according to the first preferred embodiment except for the variable power optical system 40 which is modified to use a zoom lens, and therefore, same reference symbols are assigned to identical elements and a redundant description will be omitted.

The modified variable power optical system 40 includes a zoom lens 64 and a lens driving apparatus 34B. When the zoom lens 64 is driven by the lens driving apparatus 34B, a focal length of the zoom lens 64 successively changes between that for the relatively high magnification and that for the relatively low magnification and the zoom lens 64 moves forward and backward on the optical axis OA of the optical system 4. In other words, when a binary image formed principally by a linear image is to be read from an original, the magnification of the zoom lens 64 is increased and the zoom lens 64 is moved toward the original so that an image of the original is imaged at the relatively high magnification and projected onto the CCDs 16, 26 and 36 (See FIG. 2A). When a multivalued image formed principally by a continuous tone image is to be read from an original, the magnification of the zoom lens 64 is decreased and the zoom lens 64 is moved toward the mirror 54 so that the image of the original is imaged at the relatively low magnification and projected onto the CCD 16 (See FIG. 2B).

Unlike the second preferred embodiment described above wherein a zoom lens having a continuously varying focal length is used as the variable power optical system 40, the variable power optical system 40 may be formed by a bifocal lens having a focal length which is equal to two or larger and which discontinuously changes.

Figure 3A:
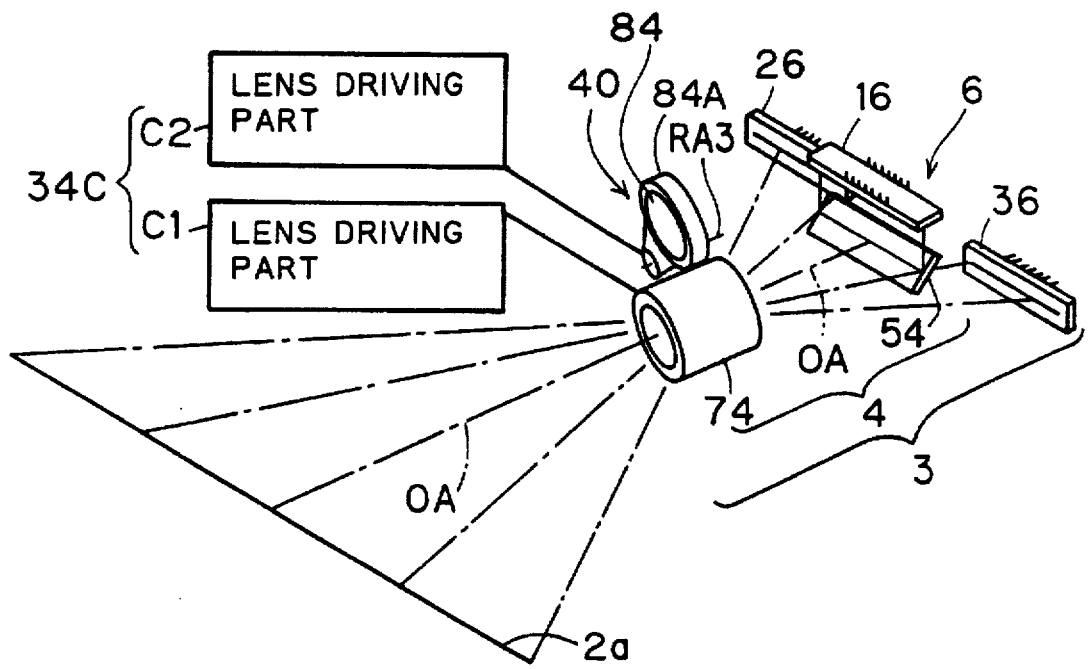
FIGS. 3A and 3B are perspective views showing a structure of an image inputting apparatus according to a third preferred embodiment of the present invention.
Figure 3B:
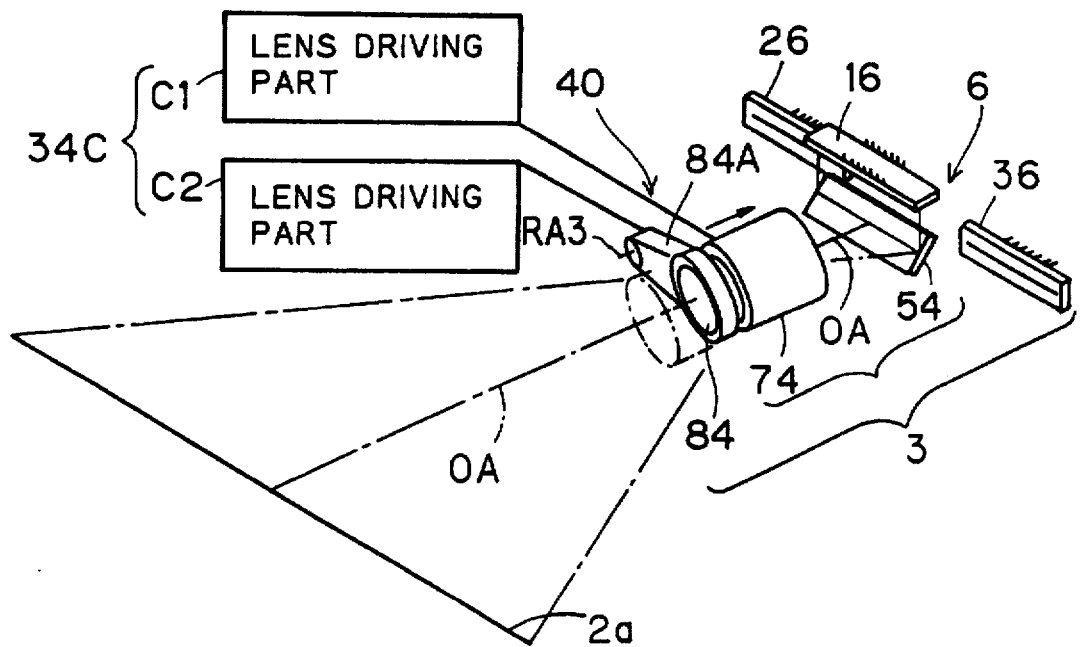

FIGS. 3A and 3B are perspective views showing a structure of an image inputting apparatus according to a third preferred embodiment of the present invention. FIG. 3A shows the image inputting apparatus as it is reading a binary image formed principally by a linear image and FIG. 3B shows the image inputting apparatus as it is reading a multivalued image formed principally by a continuous tone image. The image inputting apparatus according to the third preferred embodiment is the same as the image inputting apparatus according to the first preferred embodiment except for the variable power optical system 40 which is modified to use a conversion lens.

The modified variable power optical system 40 includes a reduction projection lens 74 and a conversion lens 84 which is held by a lens holder 84A. Driven by a lens driving part C1, the reduction projection lens 74 moves forward and backward on the optical axis OA of the optical system 4. Driven by a lens driving part C2, the conversion lens 84 rotates upon an axis of rotation $RA_3$ which is deviated from the optical axis OA in synchronization with movement of the reduction projection lens 74 and reciprocally moves (i.e., moves forward and retrieves) between its position on the optical axis OA of the optical system 4 and a retrieval position off the optical axis OA. In the third preferred embodiment, the two lens driving parts C1 and C2 properly move the reduction projection lens 74 and the conversion lens 84, thereby changing the magnification of the optical system 4. That is, when a binary image formed principally by a linear image is to be read from an original, the conversion lens 84 is moved to the retrieval position and the reduction projection lens 74 is moved toward the original along the optical axis OA so that an image of the original is imaged at the relatively high magnification and projected onto the CCDs 16, 26 and 36 (See FIG. 3A). When a multivalued image formed principally by a continuous tone image is to be read from an original, the conversion lens 84 is moved to its position on the optical axis OA and the reduction projection lens 74 is moved toward the mirror 54 so the image of the original is imaged at the relatively low magnification and projected onto the CCD 16 (See FIG. 3B).

As described above, any one of the image inputting apparatuses according to the first to the third preferred embodiments comprises the variable power optical system 40 whose magnification is switched depending on whether an original is a binary image or a multivalued image. When a binary image is read as an original, the optical system 4 including the variable power optical system 40 focuses an image of the original at the relatively high magnification (first magnification m1), the mirror 54 divides the image of the original as a whole into three images and each divided image is projected onto an associated one of the CCDs 16, 26 and 36. When a multivalued image is read as an original, the optical system 4 focuses an image of the original at the relatively low magnification (second magnification m2) and the image of the original as a whole is projected through mirror 54 onto only the CCD 16. Provided with such an optical system 4, each image inputting apparatus reads both a binary image and a multivalued image with a high quality using the same apparatus.

Although the preferred embodiments require that the original 2 is moved in the direction A-B, the original 2 may be fixed and the imaging part 3 may be moved in the direction A-B in order to move the original 2 and the imaging part 3 relative to each other.

<Lens Switching Apparatus>

A lens switching apparatus applicable to the image inputting apparatus according to the first preferred embodiment may be as follows.

Figure 4:
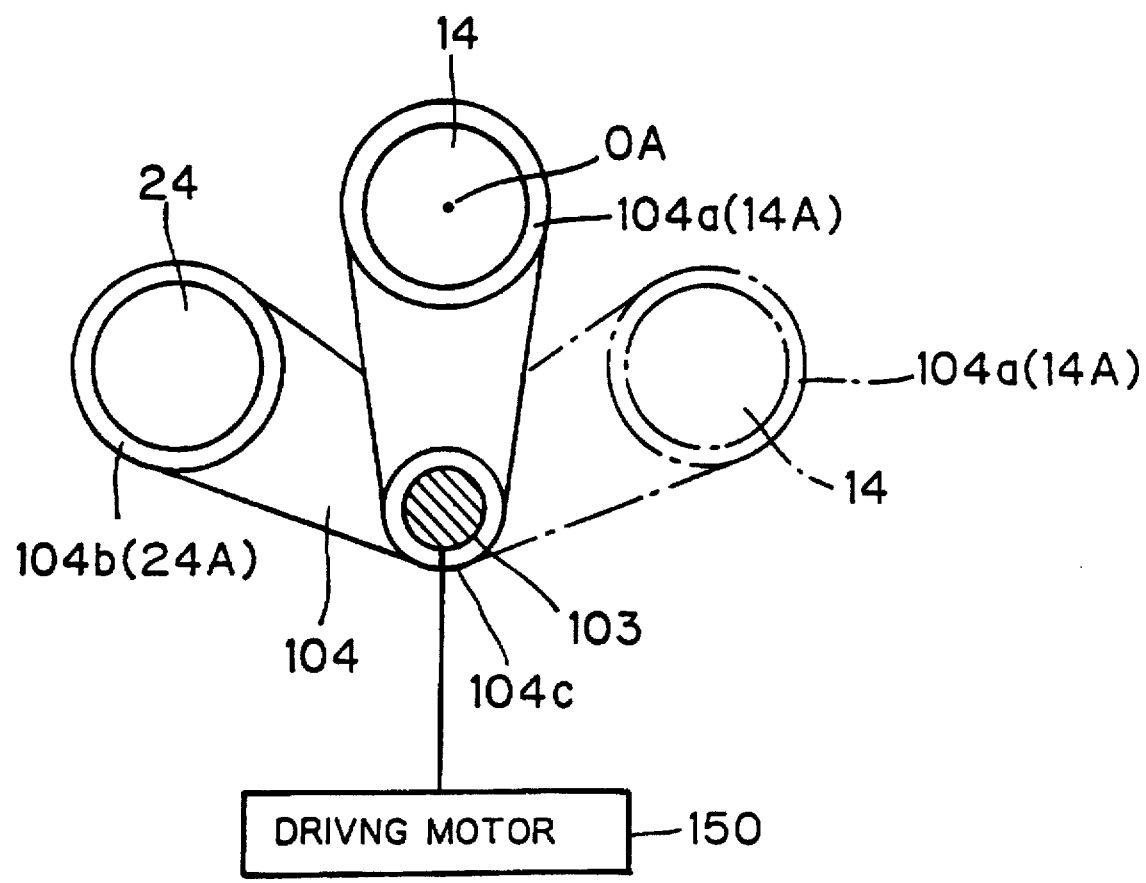
FIG. 4 is a view of a lens switching apparatus which is applicable to the image inputting apparatus of the first preferred embodiment.

FIG. 4 is a view of a lens switching apparatus which is applicable to the image inputting apparatus of the first preferred embodiment. The lens switching apparatus comprises a V-shaped lens holder 104. Reduction projection lenses 14 and 24, a pair of lenses, are fixed to tip portions 104a and 104b of the lens holder 104, respectively. The lens holder 104 includes a base portion 104c which is fixed to an axis of rotation 103. When the axis of rotation 103 is rotated in a forward direction and a backward direction by a driving motor 150, the lenses 14 and 24, a pair of lenses, alternately move on the optical axis OA. Hence, the magnification of the variable power optical system 40 is easily switched under the control of the driving motor 150.

However, to ensure a space for the lenses 14 and 24 to retrieve at the both sides of the optical axis OA, the lens switching apparatus as above is large, which directly contradicts the needs for a small image inputting apparatus.

Further, to focus an image using the lenses 14 and 24 which are disposed on the optical axis OA, the lenses 14 and 24 must be accurately and alternately disposed on the optical axis OA. To realize this, a complex mechanism is necessary.

The lens switching apparatus is preferably modified as described below to solve these problems. The image inputting apparatus of the first preferred embodiment uses a lens switching apparatus which is modified according to a modification.

Figure 5:
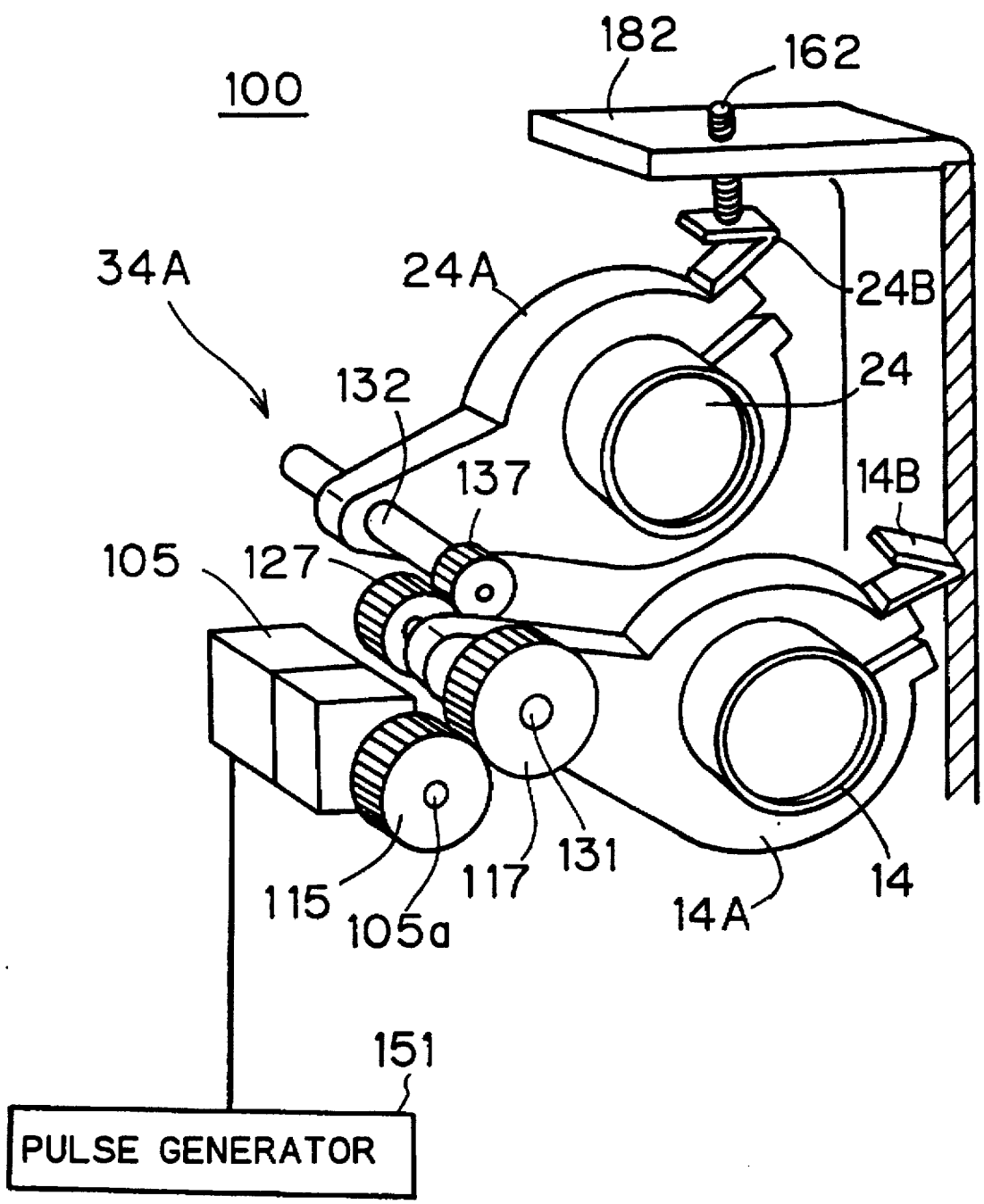
FIG. 5 is a perspective view showing an improved lens switching apparatus.
Figure 6:
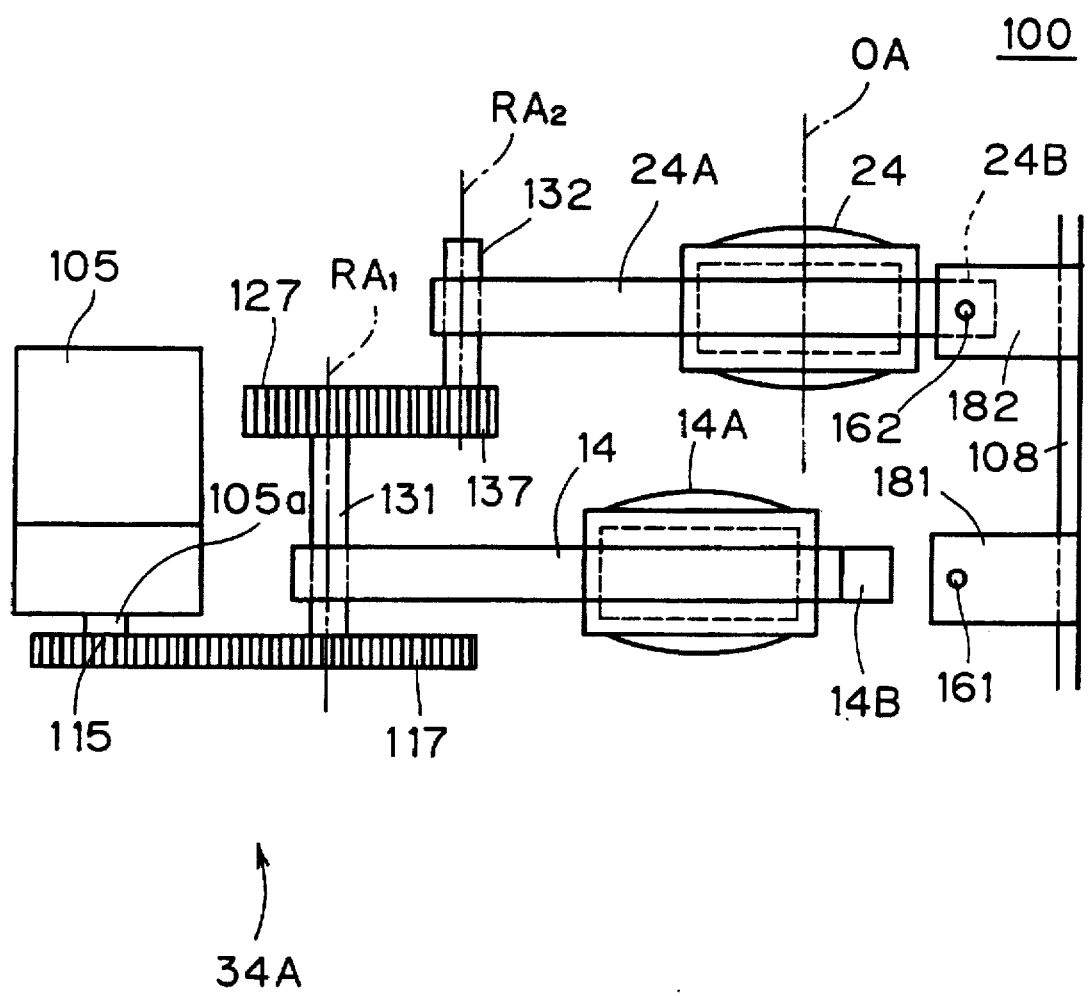
FIG. 6 is a schematic diagram of the lens switching apparatus of FIG. 5 as viewed from above.
Figure 7A:
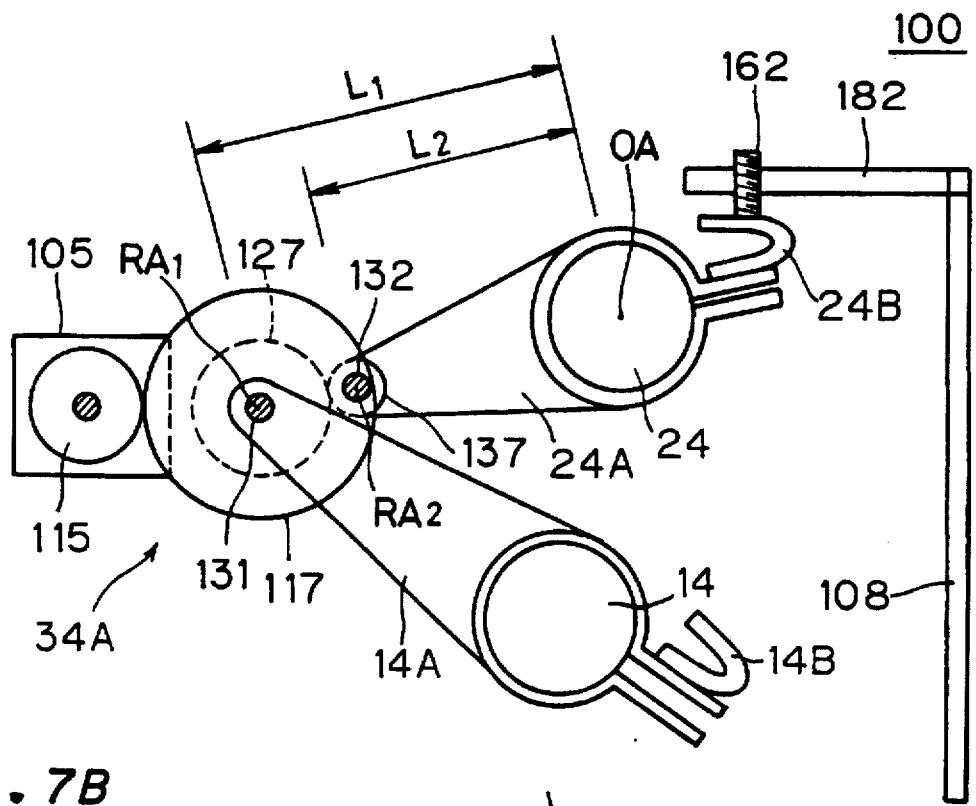
FIGS. 7A and 7B are views showing an operation of the lens switching apparatus of FIG. 5.
Figure 7B:
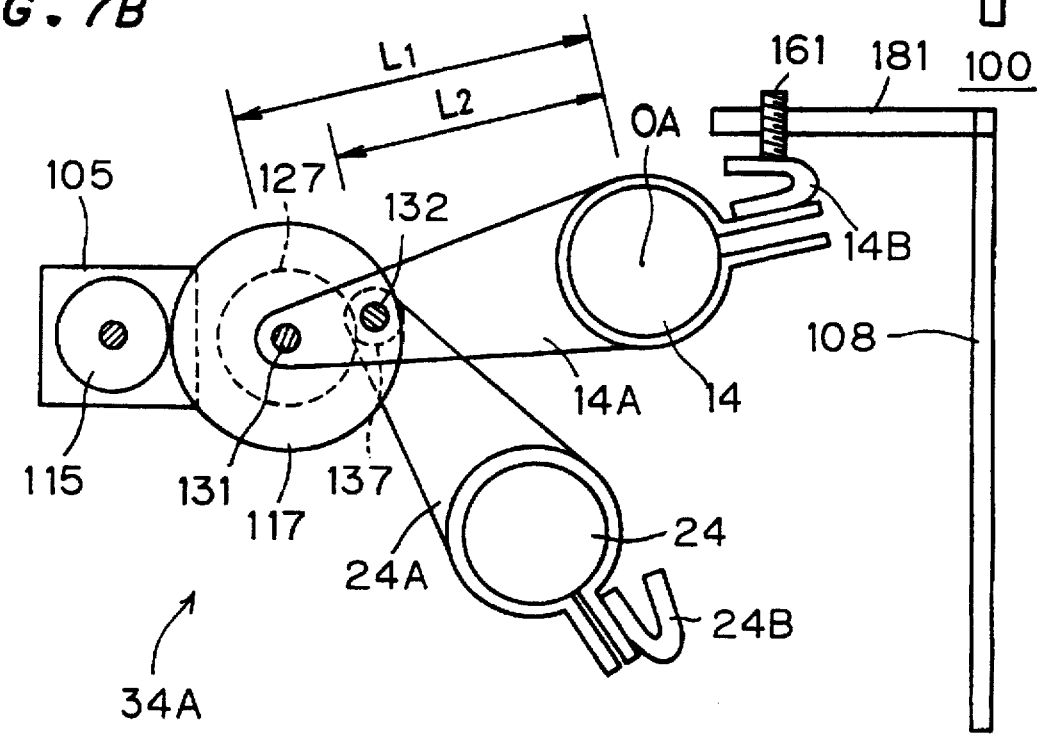

FIG. 5 is a perspective view showing an improved lens switching apparatus. The lens switching apparatus of FIG. 5 is incorporated in the image inputting apparatus of the first preferred embodiment shown in FIGS. 1A and 1B. FIG. 6 is a diagram of the lens switching apparatus of FIG. 5 as viewed from above. Further, FIGS. 7A and 7B are diagrams of the lens switching apparatus of FIG. 5 as viewed from the front, showing an operation of the improved lens switching apparatus.

The improved lens switching apparatus 100 according to the present modification is formed by a first and a second lens holders 14A and 24A and a lens driving apparatus 34A which is linked to the lens holders 14A and 24A. In FIGS. 5 and 6, at one ends, the first and the second lens holders 14A and 24A hold the first and the second reduction projection lenses 14 and 24, respectively, which have different focal lengths from each other. At the other ends, the first and the second lens holders 14A and 24A are fixed to a first and a second axes of rotation 131 and 132, respectively. The first and the second axes of rotation 131 and 132 are supported by bearings not shown for free rotation about central lines $RA_1$ and $RA_2$ (See FIG. 6), respectively, which are parallel to each other. Fixed to the first axis of rotation 131 are a first driven gear 117 engaged with a driving gear 115 which is fixed to an axis of rotation 105a of the driving motor 105 and a second driven gear 127 engaged with a third driven gear 137 which is fixed to the second axis of rotation 132. Thus, the lens driving apparatus 34A is formed by the driving motor 105, the driving gear 115, the first and the second axes of rotation 131 and 132, the first to the third driven gears 117, 127 and 137, etc.

The sizes of the second and the third driven gears 127 and 137 which engage with each other are determined so that the number of teeth of the driven gears 127 and 137 are Z1 and Z2, respectively. Hence, following the second and the third driven gears 127 and 137, the first and the second lens holders 14A and 24A rotate in opposite directions to each other, with a ratio of rotation angle (1/Z1): (1/Z2) which is equal to a ratio of inverse numbers of the teeth. As shown in FIGS. 7A and 7B, the central line $RA_1$ of the first axis of rotation 131, the central line $RA_2$ of the second axis of rotation 132 and the optical axis OA are arranged in the same plane and a ratio of an effective length $L_1$ of the first holder 14A to an effective length $L_2$ of the second holder 24A is set as $L_1:L_2=Z1:Z2$. The effective length $L_1$ of the first holder 14A is defined as a distance from the central line $RA_1$ of the first axis of rotation 131 to the center of the first lens 14 while the effective length $L_2$ of the second holder 24A is defined as a distance from the central line $RA_2$ of the second axis of rotation 132 to the center of the second lens 24.

Setting the teeth numbers Z1 and Z2 and the effective lengths $L_1$ and $L_2$ appropriately under such a condition allows the first and the second lens holders 14A and 24A to replace their positions with each other. Hence, it is possible to set the first and the second lenses 14 and 24 alternately on the optical axis OA and as viewed from front.

In other words, when the second reducing projection lens 24 is to be used to focus an image as shown in FIG. 7A, the second holder 24A moves to a second on-axis position to locate the second reducing projection lens 24 on the optical axis OA. Meanwhile, the first holder 14A moves to a first retrieval position to locate the first reducing projection lens 14 off the optical axis OA as shown in FIG. 7A. Conversely, when the first reducing projection lens 14 is to be used to focus an image as shown in FIG. 7B, the first holder 14A moves to a first on-axis position to locate the second reducing projection lens 24 on the optical axis OA. Meanwhile, the second holder 24A moves to a second retrieval position to locate the second reducing projection lens 24 off the optical axis OA as shown in FIG. 7B. As can be understood from comparison between FIGS. 7A and 7B, the first retrieval position near the first lens holder 14A shown in FIG. 7B is close to the second retrieval position near the second lens holder 24A shown in FIG. 7A.

A first and a second contact members 14B and 24B are fixed to tip portions of the first and the second lens holders 14A and 24A, respectively. When the first lens holder 14A rotates in a counter-clock direction and the first reducing projection lens 14 is set on the optical axis OA as shown in FIG. 7B, the first contact member 14B contacts a first positioning member 161 which serves as a rotation stopper to stop and position the first lens holder 14A. The first positioning member 161 is threaded on a periphery for fine adjusting a position. The first positioning member 161 is screwed into a screw hole which is formed in a bracket 181 which extends from a support member 108 in a horizontal direction and is properly fixed to the bracket 181 by means of a nut or the like (not shown). When the second lens holder 24A rotates in a counter-clock direction and the second reducing projection lens 24 is set on the optical axis OA as shown in FIG. 7A, the second contact member 24B contacts a second positioning member 162 which serves as a rotation stopper to stop and position the second lens holder 24A. The second positioning member 162 is threaded on a periphery for fine adjusting a position. The second positioning member 162 is screwed into a screw hole which is formed in a bracket 182 which extends from a support member 108 in a horizontal direction and is properly fixed to the bracket 182 by means of a nut or the like (not shown).

The driving motor 105 is a stepping motor with a reduction gear which is rotatable in a forward and a backward directions. The rotation angle of the driving motor 105 is adjusted depending on the quantity of a feed pulse which is supplied from a plus generator 151. The driving motor 105 is controlled in a simple open loop. Hence, adjusting the quantity of a feed pulse alone does not make it easy to move the first holder 14A accurately to the first on-axis position (See FIG. 7B) nor to accurately move the first reducing projection lens 14 onto the optical axis OA. Similarly, adjusting the quantity of a feed pulse alone does not make it easy to move the second holder 24A accurately to the second on-axis position (See FIG. 7A) nor to accurately move the second reducing projection lens 24 onto the optical axis OA. To deal with this, the plus generator 151 is driven to generate an increased quantity of a feed pulse during switching of the lenses 14 and 24 so that the rotation angles of the first and the second holders 14A and 24A in the counter-clockwise direction are slightly larger. This allows the first and the second contact members 14B and 24B which are respectively attached to the first and the second holders 14A and 24A to be tightly pressed against the first positioning member 161 and a second positioning member 162 without a fail. As a result, the first and the second lenses 14 and 24 are moved and positioned accurately on the optical axis OA.

Now, an operation of the variable power optical system 40 includes the lens switching apparatus 100 which is constructed as above will be briefly described. Clockwise rotation of the driving motor 105 shown in FIG. 5 rotates the driving gear 115 clockwise but rotates the first driven gear 117 which engages with the driving gear 115 counter-clockwise. This rotates the first holder 14A counter-clockwise, thereby moving the first reducing projection lens 14 onto the optical axis OA (See FIG. 7B). Since the second driven gear 127 which is fixed to the axis of rotation 131 of the first driven gear 117 rotates counter-clockwise at the same time, the third driven gear 137 which is engaged with the second driven gear 127 rotates counter-clockwise. As a result, the second holder 24A rotates clockwise, thereby removing the second reducing projection lens 24 from the optical axis OA (See FIG. 7B).

Conversely, when the driving motor 105 rotates clockwise as shown in FIG. 5, the first driven gear 117 rotates clockwise, whereby the first holder 14A rotates clockwise and the first reducing projection lens 14 is removed from the optical axis OA (See FIG. 7A). Since the second driven gear 127 rotates clockwise at the same time, the third driven gear 137 rotates counter-clockwise. As a result, the second holder 24A rotates counter-clockwise, thereby moving the second reducing projection lens 24 onto the optical axis OA (See FIG. 7A).

In the lens switching apparatus 100 which is constructed as above, the lens driving apparatus 34A switches the first holder 14A, which is movable between the first on-axis position and the first retrieval position, and the second holder 24A, which is movable between the second on-axis position and the second retrieval position. This switching operation causes the first holder 14A and the second holder 24A to be alternatively positioned onto the optical axis OA. Hence, it is possible to mount the first and the second lenses 14 and 24 appropriately onto the optical axis OA and to change the magnification. That is, when the first reducing projection lens 14 is to be mounted onto the optical axis OA to focus an image, the first holder 14A is positioned on the first axis and the second holder 24A is retrieved to the second retrieval position, whereby an image is focused at the relatively high magnification (first magnification m1). On the other hand, when the second reducing projection lens 24 is to be mounted onto the optical axis OA to focus an image, the second holder 24A is positioned on the second axis and the first holder 14A is retrieved to the first retrieval position which is close to the second retrieval position, whereby an image is focused at the relatively low magnification (second magnification m2). Further, the space for housing the first and the second lenses 14 and 24 and for retrieval of the holders 14A and 24A is small. Thus, the first and the second lenses 14 and 24 are switched and positioned in a small space.

In addition, in the improved lens switching apparatus 100, the first holder 14A is fixed to the same axis of rotation 131 of the first driven gear 117 while the second holder 24A is fixed to the same axis of rotation 132 of the third driven gear 137. Hence, it is possible to rotate the first holder 14A and the second holder 24A in opposite directions to each other without a fail in a simple mechanism.

Further, the first positioning member 161 contacts the first holder 14A when the first holder 14A moves to the first on-axis position while the second positioning member 162 contacts the second holder 24A when the second holder 24A moves to the second on-axis position, and the driving motor 105 is driven with driving pulses in number larger than that of driving pulses which are necessary to move the first holder 14A and the second holder 24A to the first on-axis position and the second on-axis position. Hence, it is possible to position the first and the second lenses 14 and 24 without a fail in a simple mechanism.

Although the foregoing has described that the improved lens switching apparatus 100 is used to switch the two reducing projection lenses 14 and 24 of the image inputting apparatus, the lens switching apparatus 100 may be used to switch other elements. The lens switching apparatus 100 is applicable to any optical apparatuses in general which requires to switch two different lenses on an optical axis.

While the invention has been described in detail, the foregoing description is in all aspects illustrative and not restrictive. It is understood that numerous other modifications and variations can be devised without departing from the scope of the invention.

We claim:

1. An image inputting apparatus for reading an image of an original, comprising:

an image reading part; and moving means for moving an original and said image reading part relative to each other, wherein said image reading part comprises:

a plurality of solid linear image sensors; and an optical system for focusing a binary image of an original at a first magnification, dividing said image into a plurality of divided images and projecting each divided image onto an associated one of said solid linear image sensors during reading of said binary image, said optical system focusing a continuous tone image of an original at a second magnification which is lower than said first magnification and projecting said image onto one of said solid linear image sensors during reading of said continuous tone image.

2. The image inputting apparatus of claim 1, wherein said optical system comprises:

a variable power optical system for focusing said image of said original, said variable power system being adapted to switch a magnification between said first magnification and said second magnification; and image dividing means for dividing an image which is focused by said variable power optical system at said first magnification and projecting said divided images each onto an associated one of said solid linear image sensors.

3. The image inputting apparatus of claim 2, wherein said variable power optical system comprises:

a first lens which is movable on an optical axis of said variable power optical system in a forward direction and a retrieval direction, said first lens focusing an image of an image at said first magnification when moved onto said optical axis;

a second lens which is movable on said optical axis of said variable power optical system in the forward direction and the retrieval direction, said second lens focusing an image of an image at said second magnification when moved onto said optical axis; and lens switching means for moving said first lens and said second lens alternately on said optical axis in the forward direction and the retrieval direction.

4. The image inputting apparatus of claim 3, wherein said lens switching means comprises:

a first lens holder for holding said first lens, said first lens holder being movable between a first on-axis position on said optical axis and a first retrieval position off said optical axis;

a second lens holder for holding said second lens, said second lens holder being movable between a second on-axis position on said optical axis and a second retrieval position off said optical axis which is close to said first retrieval position; and lens driving means for switching said first and said second lens holders to move said first and said second lens holders alternately onto said optical axis, said lens driving means moving said second lens holder to said second retrieval position when said first lens holder is at said first on-axis position, said lens driving means moving said second lens holder to said second on-axis position when said first lens holder is at said first retrieval position.

5. The lens switching means of claim 4, wherein said lens driving means comprises:

a driving motor which rotates in a forward direction and a reverse direction;

a driving gear which is fixed to a driving shaft of said driving motor;

a first driven gear which is engaged with said driving gear to rotate;

a second driven gear which is fixed to the same axis of rotation with said first driven gear; and a third driven gear which is engaged with said second driven gear to rotate, wherein said first lens holder is fixed to the same axis of rotation with said first driven gear while said second lens holder is fixed to the same axis of rotation with said third driven gear.

6. The lens switching means of claim 5, further comprising:

a positioning member which contacts said first lens holder when said first lens holder is moved to said first on-axis position but contacts said second lens holder when said second lens holder is moved to said second on-axis position; and pulse generating means for driving said driving motor by signal, said pulse generating means providing said driving motor with driving pulses in number larger than that of driving pulses which are necessary to move said first and said second lens holders respectively to said first and said second on-axis positions.

7. The image inputting apparatus of claim 2, wherein said variable power optical system comprises a zoom lens.

8. The image inputting apparatus of claim 9 wherein said variable power optical system comprises a bifocal lens.

9. The image inputting apparatus of claim 2, wherein said variable power optical system comprises:

an imaging lens which is disposed on said optical axis of said variable power optical system;

a conversion lens which is movable on said optical axis in a forward direction and a retrieval direction; and lens driving means for moving said conversion lens on said optical axis in the forward direction and the retrieval direction.

10. The image inputting apparatus of claim 2, wherein said image dividing means is a mirror.

11. The image inputting apparatus of claim 2, wherein either one of said solid linear image sensors is disposed on said optical axis, said image dividing means divides said image of said original which is focused by said variable power optical system at said first magnification and projects said divided images each onto an associated one of said solid linear image sensors, and said image dividing means projects said image which is focused at said second magnification onto one of said solid linear image sensors which is located on said optical axis.

12. The image inputting apparatus of claim 11, wherein said image dividing means is a mirror which is disposed between said variable power optical system and said one of said solid linear image sensors onto which said image focused at said second magnification is projected.

* * * * *